United States Patent [19]

Schillo

[11] Patent Number: 5,139,323
[45] Date of Patent: Aug. 18, 1992

[54] HEMIANOPSIA REHABILITATION TRAINING SYSTEM

[76] Inventor: Paula L. Schillo, 1582 First Ave., Apt. 2B, New York, N.Y. 10028

[21] Appl. No.: 646,517

[22] Filed: Jan. 25, 1991

Related U.S. Application Data

[63] Continuation of Ser. No. 463,275, Jan. 10, 1990, abandoned.

[51] Int. Cl.$^5$ .............................................. G02C 7/16
[52] U.S. Cl. ....................................... 351/45; 351/203
[58] Field of Search ..................... 351/203, 45, 46, 167

[56] References Cited

U.S. PATENT DOCUMENTS

| | | |
|---|---|---|
| 4,155,633 | 5/1979 | Benavie . |
| 4,493,538 | 1/1985 | Tolliver . |
| 4,733,958 | 3/1988 | Gorsich . |
| 4,828,380 | 5/1989 | Cherian ................................. 351/45 |

OTHER PUBLICATIONS

Duke-Elder: Ophthalmic Optics and refraction, vol. V., 1970 pp. 704–705.

*Primary Examiner*—Paul M. Dzierzynski
*Attorney, Agent, or Firm*—Schweitzer Cornman & Gross

[57] ABSTRACT

A training system for rehabilitation of hemianopsia patients, including a first training device adapted to be placed before the eyes of a hemianopsia patient during a first phase of training, said first training device having blocking means for substantially blocking the passing of light therethrough, and transmitting means for substantially passing light therethrough, said blocking means being disposed in the part of the field of vision outside of the scotoma, and said transmitting means being disposed in the part of the field of vision in which there is no longer any vision due to the scotoma and a second training device adapted to be placed before the eyes of a hemianopsia patient during a second phase of training, said second training device comprising disposed before each eye means for transmitting light, the means for transmitting light before one of the eyes having applied thereto an indicator mark ranging from the boundary of the scotoma and the functional visual field toward the edge of the scotoma that is remote from the functional visual field, for reminding the patient to turn his eyes in the direction of the scotoma when vision into that area is required.

11 Claims, 1 Drawing Sheet

HEMIANOPSIA REHABILITATION TRAINING SYSTEM

This is a continuing application of U.S. Ser. No. 463,275 filed on Jan. 10, 1990, now abandoned.

FIELD OF THE INVENTION

The invention relates to a system for rehabilitation training and reminding hemianopsia patients to use proper vision practice.

BACKGROUND OF THE INVENTION

Hemianopsia, or as it is sometimes also referred to "hemianopia", is a pathological condition which takes place entirely in the brain and optical nerve tract. It is caused by stroke, brain tumor, lesions, or other damage to the brain. It results in the loss of half of the field of vision. The condition is generally a homonymous condition which affects both eyes. One refers to a macular split when the hemianopsia goes right down the center of the visual field. The macula is the central portion of the retina.

The area of visual defect, or the one in which no vision is available, is referred to as the scotoma. Depending on the size of the scotoma peripheral or side vision is very substantially reduced whereby the patient cannot see anything in the area of the scotoma without turning his eyes or head.

Hemianopsia usually affects the field of vision in both near and far vision. Devices are known for correcting vision of patients suffering from homonymous hemianopsia, usually by a corrective device containing prisms and/or mirrors, which extends lateral vision. U.S. Pat. Nos. 4,155,633; 4,493,538, and 4,733,958 and the hemianoptic spectacles reviewed in Duke Elder et al., Ophthalmic Optics and Refraction, vol. V., 1970, pp. 704–705, relate to device of this kind.

A major problem in hemianopsia is that it is not perceived by the patient. It does not manifest itself to the patient as a big black spot in the midst of a good field of vision. Therefore, the major problem continues to be the need to remind the patient of the condition and to inculcate habits to respond to nonphysical, but purely mental, memorized stimuli. None of the devices of the prior art provide this kind of training.

DESCRIPTION OF THE INVENTION

In contrast with the devices of the prior art, which artifically alter the contents of the existing visual field, by prisms and/or mirrors, the present invention is concerned with a system for rehabilitation of hemianopsia patients. The present system encompasses a stepwise method and training devices therefor, for improving both near and far vision of hemianopsia patients.

The rehabilitation system of the present invention is designed for patients with partial or complete homonymous hemianopsia with or without macular splitting. Rehabilitation is conducted in two phases with different objectives in each phase.

The objectives of the first phase include making patients more aware of the extent of their visual loss; educating the patient to use eye muscles that might otherwise go unused in the post acute stages of physical and cognitive therapy following head injury, stroke, or neurosurgery; and to have the patients make purposeful eye movements into their blind areas to encourage purposeful scanning of the blind area in daily functioning.

These first stage objectives are achieved by a first training device which is a vision blocking device which blocks out vision in the patient's good visual field. Clear, unblocked vision can be had only through the area of the scotoma of each eye. The purpose of this first training device is to get the patient adjusted to move his eyes all the way to the periphery of his scotoma.

The objectives of the second stage of the hemianopsia rehabilitation training system of the present invention is to provide patients with constant scanning remainder throughout the later stages of recovery into post-training autonomy, and to guide eye movement in the proper direction to make scanning more efficient. The objectives of the second stage are achieved with a second training device in which a guiding mark or curve is placed in front of one eye of the patient, which extends from the parafoveal boundary of the scotoma through the scotoma to the periphery of the glasses. This curve acts as a reminder to guide the patient's vision toward the remote end point of the mark to act as an anchor or reminder for the patient to follow the mark with his eyes into the blind area regardless of the direction or extent to which the patient's head is turned.

The first training device of the present invention is adapted to be placed before the eyes of a hemianopsia patient during the first phase of training. The first training device has blocking means for substantially blocking the passing of light therethrough, and transmitting means for substantially passing light therethrough, the blocking means being disposed in the part of the field of vision outside of the scotoma, i.e., good visual field, and the transmitting means are disposed in the part of the field of vision in which there is no longer any vision due to the scotoma. The second training device of the present invention is adapted to be placed before the eyes of a hemianopsia patient during the second phase of training. The second training device comprises disposed before each eye means for transmitting light, the means for transmitting light before one of the eyes has applied thereto an indicator or mark ranging from the outer boundary of the scotoma to the perifoveal area and the functional visual field, for reminding the patient to turn his eyes in the direction of the scotoma when vision into that area is required.

The first and second training devices of the present invention can be either a pair of special lenses which can be clipped on the patient's glasses, or if the patient does not wear any glasses, then either training device can be a pair of nonprescription glasses. Even if in describing either device, reference is made to nonprescription glasses it is, however, to be understood that clip-on lenses or other means of interposing a device between the eye and the field of vision of the patient are also meant to be included. Furthermore, unless otherwise qualified, when referring to "field of vision" the entire former field of vision is meant, including the area which since the visual impairment-causing trauma, became visually impaired by the scotoma.

DESCRIPTION OF THE DRAWING

The invention is described in greater detail with reference being had to the drawing, wherein.

DETAILED DESCRIPTION OF THE INVENTION

Figure 1:
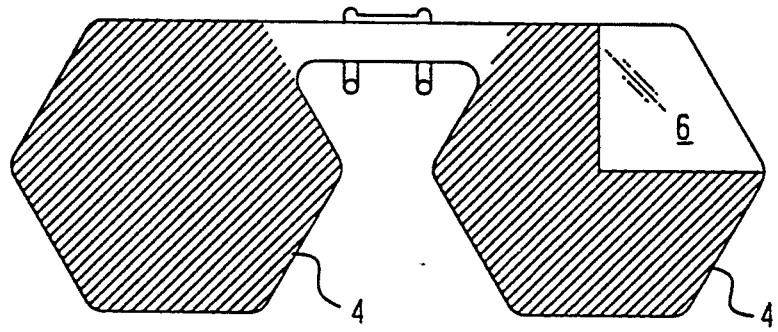
FIG. 1 is an elevational view of a first training device.

As shown in FIG. 1 a first training device 2 shown, in this embodiment as being a pair of clip-on lenses which can be clipped onto an existing pair of glasses. The area shown as being darkened on each lens 4 corresponds to the part of the visual field in which the patient still has vision. Conversely, the lighter areas 6 of each lens 4 correspond to the area of failure of vision due to the shape and location of the scotoma. The patient which wears the first training device 2 will see through that training device only if he turns his eyes towards the transparent area to see through it, because the remainder of each lens 4 is completely blocked.

Therefore, if the patient intends to see anything when wearing the first training device, he will have to learn to turn his eyes in the direction of the scotoma. Eventually that turning of the eyes in the proper direction becomes a habit and at that point the first phase rehabilitation training of the homonymous hemianopsia patient is completed.

In another preferred embodiment of the first training device the visual field for the eye that is on the opposite side of the hemianopsia, is suitably completely blocked whereby it has no lighter area 6 at all. Thus, in the case when the hemianopsia is on the left side, in this embodiment the lighter area 6 on the right lens 4 is completely eliminated. This is to avoid in the example the patient looking through the area 6 on the right lens with both eyes, rather than looking all the way to the left where each eye must through its respective light area 6. This can also be expressed by stating that the blocking of the entire lighter area 6 reduces stimulation to the contralateral superior colliculus, thus enhancing the integrated functioning of the lesioned cortical area with its ipsilateral superior colliculus.

The first phase training takes place within the confines of the rehabilitation center, and usually within the same room. Therefore, as a result of the first phase of the rehabilitation training the patient is used to view through the transparent portion of the first training device only under the same ambient circumstances. The controlled environment of the rehabilitation center presents only a limited variety of visual challenges to the patient. Therefore, the patient does not fully realize the enormity of his visual loss until the patient leaves the rehabilitation center and meets unforseen obstacles in various other settings, such as outdoors.

Once the patient becomes used to turning his eyes into the direction of the scotoma the training within the rehabilitation center is more or less complete. It is at this stage that the patient needs constant reminder to scan into the direction of the scotoma, even when it is not prompted by any transitory visual challenge to do so. At this point the prior visual training will not help the patient simply because he will not remember to look into the direction of the scotoma. This is, because the problem is not a question of memory, but is a matter of responding to exterior stimuli. The visual stimuli arrive to the patient always from the still active portion of the visual field, which is either from the center or from the opposite direction of where the scotoma lies. Therefore the patient tends to look in the direction that is opposite to the scotoma because that is where things appear that clamor for his attention.

It has also been found that a subconscious pull of vision towards the good visual field is an unconscious attempt by the patient to center himself with respect to his surroundings.

Prior rehabilitation training involved target-finding tasks on computer screens that required the patient to scan to the right or to the left of center in search of a target. This teaches the patient to scan his immediate environment within 1-3 feet, but this ignores the greater than 3-feet radius which extends in all directions and a complete 360° around the person. Thus the patient would never really achieve visual autonomy because he does not learn visually to engage the ambient environment per se. The direction of the blind area constantly changes with the patient's changing focal point. Consequently, just looking into the direction of the scotoma away from a central fixation point which is directly ahead of a person, is not sufficient to bring the environment into view.

Figure 2:
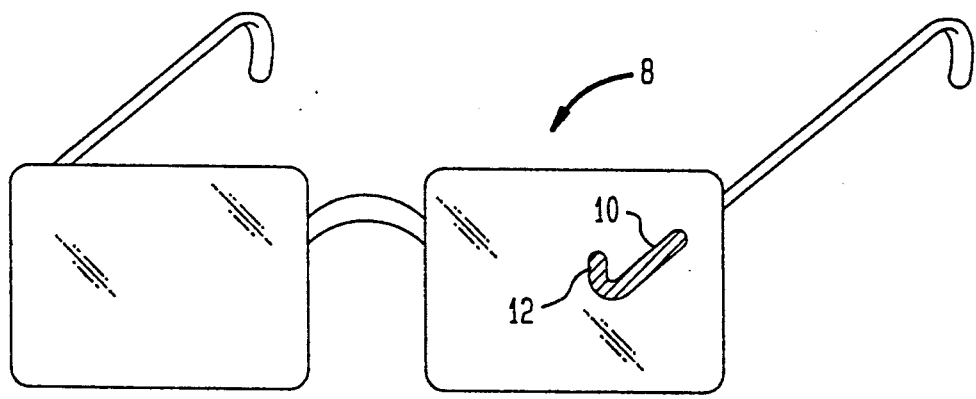
FIG. 2 is an elevational view of a second training device.

Therefore, I have invented a means for constantly reminding the patient to look into his scotoma and to see when looking into that direction by appropriately turning his eyes, not only by directing his vision. This is achieved by a second training device 8 which is placed between the eyes of the patient and his visual field. In the described preferred embodiment this second training device 8 is described in terms of a pair of glasses. These can be a pair of prescription glasses if the patient needs a prescription, or nonprescription glasses if prescription glasses are not required. The second training device 8 shown in FIG. 2 assumes the scotoma to be to the left of the fovea, in the same direction as shown by the lighter area 6 of the first training device in FIG. 1. The means for reminding the patient for turning his eyes into the blind area is shown in FIG. 2 as a check mark shaped mark 10. This mark grabs the attention of the patient with its small interior "hook" 12 which is located in the parafoveal area on the borderline between the scotoma and the fovea. The eye is then guided from the hook 12 by the portion of the mark extending through the scotoma to the boundary of the eyeglass 8 all the way in and through the scotoma. If desired, the mark can have an enlarged portion instead of a hook 12 and a continuously narrowing stem to guide the eye to the scotoma.

The mark 10 can be painted onto the lens of the glass, or it can be an adhesive material, or it can be sandblasted, or otherwise marked into the material of the glass.

The mark provides an anchor which consistently goes wherever the patient goes and it is always there to guide the vision of the patient into the blind area regardless to which direction or what extend the patient's head is turned. It serves as a constant reminder for the patient to scan his blind field.

Only a single mark 10 is to be used on one lens in the second training device. In this manner vision remains completely unobstructed on the other lens.

It is preferable that the mark 10 be of a light color, such as yellow, because it is less obstructive than a darker color such as red or blue.

A hemianopsia patient is not bothered by the constant presence of the mark on the lens, as someone with normal vision would be bothered. Hemianopsia patients can tolerate the mark because they do not see it most of the time. While the patient does not see the mark constantly, he sees it a great deal and this subjects the patient to a habituation effect. In fact, the more habituated the patient becomes, the more frequently the mark can be removed from the glasses for a few days every few weeks and for longer periods as time goes on.

Figure 3:
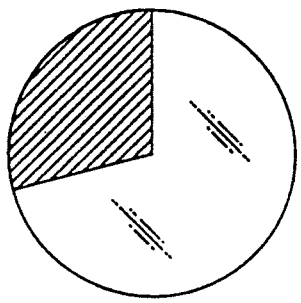
FIG. 3 is the impaired visual field of a patient with typical homonymous hemianopsia.
Figure 4:
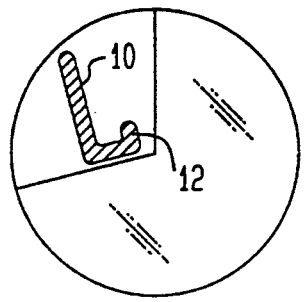
FIG. 4 illustrates the visual reminder marker embodied in the second training device for a patient having the visual field shown in FIG. 3.

FIGS. 3 and 4 provide a further illustration of the disposition of the mark 10 relative to the scotoma in the case of a scotoma located on the right side. In FIG. 3 the entire circle represents the complete visual field, the dark area is the area of the scotoma and the bigger light area represents the remaining field of good vision. FIG. 4 illustrates for this kind of scotoma the positioning of the mark 10 and the hook 12 to guide the eye into and through the scotoma.

When the scotoma is partial, as shown by the dark area in FIG. 3, from the direction of facing the patient, then the mark 10 should look more like a letter "L". When there is macular splitting, such as shown by the dashed line in FIG. 3 to which the dark area should be notionally enlarged, then the mark 10 should curl up near to the peripheral area such as is shown in FIG. 4 from the same direction as FIG. 3, by the presence of the hook 12. The lower edge of the mark thus borders on the intact visual area so that its appearance or suitably its color catches the patient's eye whenever it looks above the central fixation point. The entire mark however is placed in the blind area of the scotoma.

The curled hook 12 of the mark 10 is also placed so that its colored border comes very close to the macular split. Hence, only a minimal deviation of the eyes to the left (in the case of FIGS. 3 and 4) brings the colored edge of the mark into view.

Thus, the lower, or hook-portion 12 of the mark 10 enhances the utility of mark in two ways. Whenever the patient looks (a) slightly up or (b) slightly to the left (both of these being blind areas for this person), the mark comes into view. The mark, of course, has the same effect and function in other quadrant- or partial hemianopsia, but its orientation on the device would, of course, be different.

A complete hemianopsia would not need a "L"-shaped mark, because shifting the eyes up or down would not bring the border of the mark into view. Regardless of the size of direction of the scotoma, when there is a macular split, the mark should be placed close but not too close to the parafoveal region, because if it too close, it may interfere with reading and other close visual work.

The remainder of the mark points directly into the blind area of the scotoma. The angle at which the mark extends to the periphery is critical for maximum visual compensation. Therefore, the angle of the mark should pass through the center of the blind region to minimize unscanned areas of the scotoma both at its top and its bottom.

Any reference to any part of the human anatomy or the eye in the claims hereof is only for purposes of identifying parts of the devices claimed herein. The devices are being claimed whether or not they are being worn by a patient.

I claim:

1. A training system for rehabilitation of a hemianopsia patient having a determined defined reduction of visual field due to a scotoma deriving from damage to the optic nerve tract, which comprises:

(a) a first training device adapted to be placed before the eyes of said patient during a first phase of training, said first training device having blocking means for substantially blocking the passing of light therethrough, and transmitting means for substantially passing light therethrough, when said first training device is worn, then said blocking means is disposed in front of the part of the visual field of the patient in which vision exists, and said transmitting means is disposed before the part of the visual field in which no vision exists due to the scotoma; and (b) a second training device adapted to be placed before the eyes of said patient during a second phase of training, said second training device comprising a plurality of light transmitting means, one of said light transmitting means, when said second training device is worn, being disposed before an eye of said patient, one of said light transmitting means having applied thereto a reminder mark disposed entirely within a defined area of that light transmitting means, which defined area is adapted to be placed before said defined part of the visual field, said mark starting at the boundary of said defined area, said mark being provided for guiding said patient's vision and for reminding said patient to look toward the direction of the mark.

2. The training system of claim 1, wherein said first training device has two individual means each adapted to be disposed in front of a functional eye of a patient, said individual means comprising one or two windows having vision partially blocked therethrough and when only one of the individual means is partially blocked, then the other is totally blocked and such partially blocked, visual means is adapted to be disposed before the eye on the side that is opposite to the side on which the scotoma is disposed.

3. The training system of claim 1, wherein said first training device comprises a pair of eyeglasses having two lenses, or a device having two lenses that can be clipped over a pair of eyeglasses, each of said lenses being rendered substantially opaque, except for the area of the scotoma in at least one of said lenses.

4. The training system of claim 1, wherein said second training device comprises a pair of eyeglasses having a pair of prescription or nonprescription lenses, one of said lenses having a mark applied thereto, said mark ranging from the parafoveal area of the scotoma in the field of vision of that eye substantially to the periphery of the lens before that eye.

5. The training system of claim 4, wherein said mark is substantially "L" shaped or has substantially the shape of a checkmark.

6. The training system of claim 4, wherein said mark is lightly colored, and its end in the parafoveal area is shaped like a hook.

7. A training device adapted to be placed during a first phase of training before the eyes of a hemianopsia patient having a determined defined reduction of visual field due to a scotoma deriving from damage to the optic nerve tract, said training device having blocking means for substantially blocking the passing of light therethrough, and transmitting means for substantially passing light therethrough, when said training device is worn, then said blocking means is disposed in front of the part of the visual field of the patient in which vision exists, and said transmitting means being is disposed before the part of the visual field in which no vision exists due to the scotoma.

8. The training device of claim 7, wherein said device has two individual means, each adapted to be disposed in front of a functional eye of the patient, said individual means comprising one or two windows having vision partially blocked therethrough, and when only one of the individual means is partially blocked, then the other is totally blocked, and such partially blocked visual means is adapted to be disposed before the eye on the side of the head that is opposite to the side on which the scotoma is disposed.

9. A vision reminding device adapted to be placed before the eyes of a hemianopsia patient having a determined defined reduction of visual field due to a scotoma deriving from damage to the optic nerve tract, said vision reminding device comprising a plurality of light transmitting means, one of said light transmitting means when said vision reminding device is worn, being disposed before an eye of said patient, one of said light transmitting means having applied thereto a reminder mark disposed entirely within a defined area of said light transmitting means, which defined area is adapted to be placed before said defined part of the visual field, said mark starting at the boundary of said defined area, said mark being provided for guiding said patient's vision and for reminding said patient to look toward the direction of the mark.

10. The vision reminding device of claim 9, which comprises a pair of eyeglasses having a pair of prescription or nonprescription lenses, one of said lenses having a mark applied thereto, said mark ranging from the parafoveal area of the scotoma in the field of vision of that eye substantially to the periphery of the lens before that eye.

11. The vision reminding device of claim 10, wherein said indicator mark is substantially "L" shaped or has substantially the shape of a checkmark.

* * * * *